(12) United States Patent
Reinecke et al.

(10) Patent No.: US 10,064,336 B2
(45) Date of Patent: Sep. 4, 2018

(54) SIEVE ARRANGEMENTS FOR A CLEANING SYSTEM IN AN AGRICULTURAL HARVESTER

(71) Applicant: CNH Industrial America LLC, New Holland, PA (US)

(72) Inventors: Clay A. Reinecke, Blue Grass, IA (US); Kevin S. Schwinn, Orion, IL (US); Craig E. Murray, Davenport, IA (US); Orlin W. Johnson, Geneseo, IL (US); Kai Zhao, Willowbrook, IL (US); Jishan Jin, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 86 days.

(21) Appl. No.: 15/218,589

(22) Filed: Jul. 25, 2016

(65) Prior Publication Data

US 2017/0020072 A1    Jan. 26, 2017

Related U.S. Application Data

(60) Provisional application No. 62/196,071, filed on Jul. 23, 2015.

(51) Int. Cl.
| | |
|---|---|
| *A01F 12/32* | (2006.01) |
| *B07B 1/00* | (2006.01) |
| *A01F 12/44* | (2006.01) |
| *A01D 41/12* | (2006.01) |

(52) U.S. Cl.
CPC ............ *A01F 12/446* (2013.01); *A01D 41/12* (2013.01)

(58) Field of Classification Search
CPC ..... B07B 2201/02; B07B 1/40; B07B 1/4645; A01F 12/446
USPC .................................................. 209/405, 399
See application file for complete search history.

(56) References Cited

U.S. PATENT DOCUMENTS

| | | | | |
|---|---|---|---|---|
| 1,701,778 | A | | 2/1929 | Johnson |
| 3,666,095 | A | * | 5/1972 | Krynock ................... B07B 1/46 209/254 |
| 4,338,337 | A | * | 7/1982 | Frankl ..................... B03B 9/061 119/161 |
| 4,381,669 | A | * | 5/1983 | Peters ....................... B07B 1/06 209/237 |
| 4,487,323 | A | * | 12/1984 | Marrs ..................... B07B 1/185 209/408 |
| 4,572,782 | A | * | 2/1986 | Smith ....................... B07B 1/46 193/3 |
| 4,592,275 | A | * | 6/1986 | Frankl .................... A23N 17/00 209/254 |
| 4,755,287 | A | * | 7/1988 | Jones ....................... B07B 1/06 209/235 |

(Continued)

FOREIGN PATENT DOCUMENTS

| | | |
|---|---|---|
| CN | 204953336 | 1/2016 |
| WO | 9962325 A1 | 12/1999 |
| WO | 02087314 A2 | 11/2002 |

*Primary Examiner* — Arpad Fabian-Kovacs
(74) *Attorney, Agent, or Firm* — Patrick M. Sheldrake

(57) ABSTRACT

A cleaning system for an agricultural combine harvester includes a sieve having a periphery and an interference member located at the periphery. A chaffer frame carries the sieve, and includes a clamp with a pair of spring fingers positioned on either side of the interference member, thereby retaining the sieve within the chaffer frame.

14 Claims, 5 Drawing Sheets

(56) References Cited

U.S. PATENT DOCUMENTS

| | | | | |
|---|---|---|---|---|
| 4,839,036 A * | 6/1989 | Slesarenko | B07B 1/34 209/315 |
| 4,960,510 A * | 10/1990 | Wolff | B01D 29/05 209/405 |
| 5,215,197 A * | 6/1993 | Harvey | B07B 1/04 209/235 |
| 5,377,846 A * | 1/1995 | Askew | E04C 2/42 209/399 |
| 5,879,734 A * | 3/1999 | Broyles | A23N 5/01 426/481 |
| 5,899,340 A * | 5/1999 | MacNaughton | B07B 1/005 209/325 |
| 6,000,554 A * | 12/1999 | Hughes | B07B 1/005 209/311 |
| 6,036,126 A * | 3/2000 | Cappola | B07B 1/28 209/315 |
| 6,070,736 A * | 6/2000 | Ballman | B07B 1/46 209/325 |
| 6,073,979 A * | 6/2000 | Nawalaniec | B07B 1/46 209/372 |
| 6,079,568 A * | 6/2000 | Loshe | B01D 33/0353 209/311 |
| 6,135,020 A * | 10/2000 | Broyles | A23N 5/01 426/481 |
| 6,585,584 B2 | 7/2003 | Buermann | |
| 6,659,286 B2 | 12/2003 | Seyffert et al. | |
| 6,790,137 B2 | 9/2004 | Gordon | |
| 7,011,579 B2 | 3/2006 | Gordon | |
| 7,497,775 B1 | 3/2009 | Claerhout et al. | |
| 7,731,035 B2 * | 6/2010 | Zubovich | B07B 1/4645 209/399 |
| 7,841,476 B2 * | 11/2010 | Johnson | B07B 1/4645 209/392 |
| 8,727,127 B2 * | 5/2014 | Woodgate | B07B 1/4645 209/397 |
| 8,887,922 B2 * | 11/2014 | Lilly | B07B 1/4645 209/399 |
| 9,080,314 B1 * | 7/2015 | Rossi, Jr. | B07B 1/46 |
| 2003/0015460 A1 * | 1/2003 | Ballman | B07B 1/42 209/331 |
| 2003/0173257 A1 * | 9/2003 | Olsen | B07B 1/46 209/1 |
| 2005/0167341 A1 * | 8/2005 | Bacho | B07B 1/46 209/405 |
| 2005/0173311 A1 * | 8/2005 | Turnbull | A01K 5/001 209/419 |
| 2008/0011652 A1 * | 1/2008 | Takev | B07B 1/42 209/405 |
| 2008/0047878 A1 * | 2/2008 | Vaine | B07B 1/00 209/421 |
| 2010/0044281 A1 * | 2/2010 | Johnson | B07B 1/4645 209/399 |
| 2010/0206782 A1 * | 8/2010 | Britting | B07B 1/46 209/682 |
| 2013/0277281 A1 * | 10/2013 | McClung, III | B07B 1/46 209/346 |
| 2014/0262978 A1 * | 9/2014 | Wojciechowski | B07B 1/469 209/397 |
| 2015/0290682 A1 * | 10/2015 | Paul | B07B 1/4645 209/405 |
| 2016/0214141 A1 * | 7/2016 | Schneider | B07B 1/00 |
| 2017/0291193 A1 * | 10/2017 | Takev | B07B 1/48 |
| 2017/0312785 A9 * | 11/2017 | Wojciechowski | B07B 1/4618 |

* cited by examiner

SIEVE ARRANGEMENTS FOR A CLEANING SYSTEM IN AN AGRICULTURAL HARVESTER

CROSS REFERENCE TO RELATED APPLICATIONS

This is a non-provisional application based upon U.S. provisional patent application Ser. No. 62/196,071, entitled "SIEVE ARRANGEMENTS FOR A CLEANING SYSTEM IN AN AGRICULTURAL HARVESTER", filed Jul. 23, 2015, which is incorporated herein by reference.

BACKGROUND OF THE INVENTION

1. Field of the Invention

The present invention relates to agricultural harvesters such as combines, and, more particularly, to cleaning systems used in such combines.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The cleaning system can include a sieve which is mounted within a chaffer frame, and the chaffer frame is oscillated in a fore-to-aft direction to clean the grain. The sieve can be removable from the chaffer frame for cleaning and repair, but removal of the sieve can be difficult.

What is needed in the art is a cleaning system with a sieve which can be more easily removed from and installed within a chaffer frame, and securely held in place during oscillations of the chaffer frame.

SUMMARY OF THE INVENTION

The present invention provides a cleaning system with a chaffer frame having a clamp, and a sieve with an interference member which interacts with the clamp to guide the sieve into place within the chaffer frame, and hold the sieve within the chaffer frame.

The invention in one form is directed to a cleaning system for an agricultural combine harvester, including a sieve having a periphery and an interference member located at the periphery. A chaffer frame carries the sieve, and includes a clamp with a pair of spring fingers positioned on either side of the interference member, thereby retaining the sieve within the chaffer frame.

The invention in another form is directed to an agricultural combine harvester, including a chassis and a cleaning system carried by the chassis. The cleaning system includes a sieve having a periphery and an interference member located at the periphery. A chaffer frame carries the sieve, and includes a clamp with a pair of spring fingers positioned on either side of the interference member, thereby retaining the sieve within the chaffer frame.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
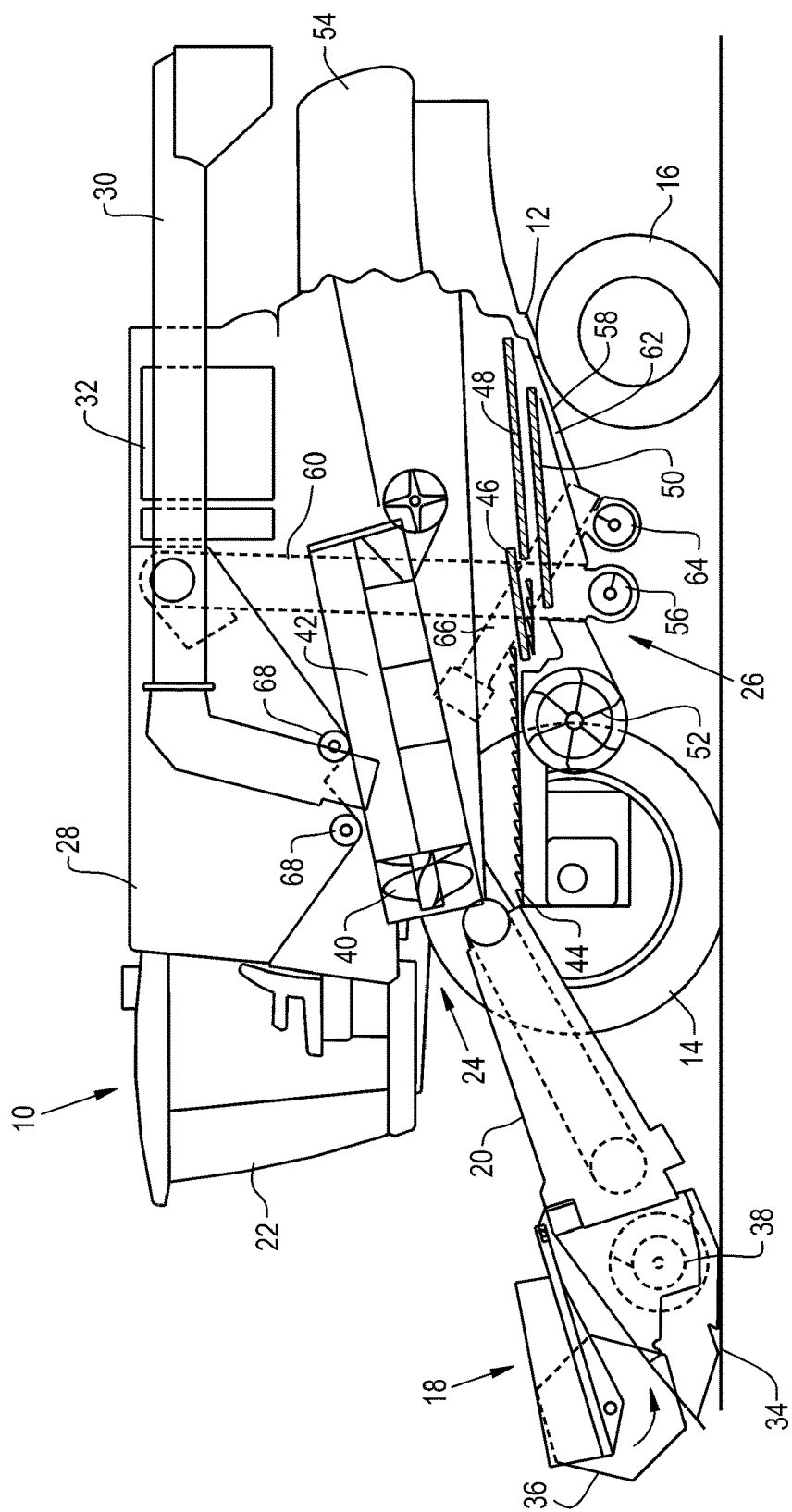
FIG. 1 is a side view of an embodiment of an agricultural harvester in the form of a combine which may include sieve arrangements of the present invention.
Figure 2:
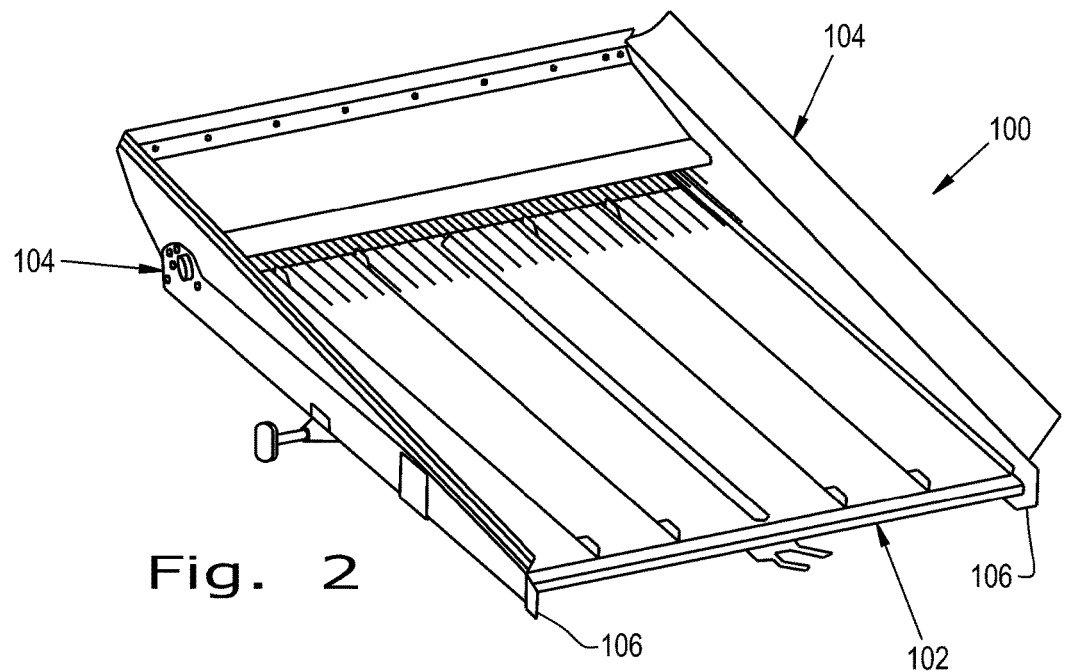
FIG. 2 is a perspective view of an embodiment of a sieve arrangement of the present invention.
Figure 3:
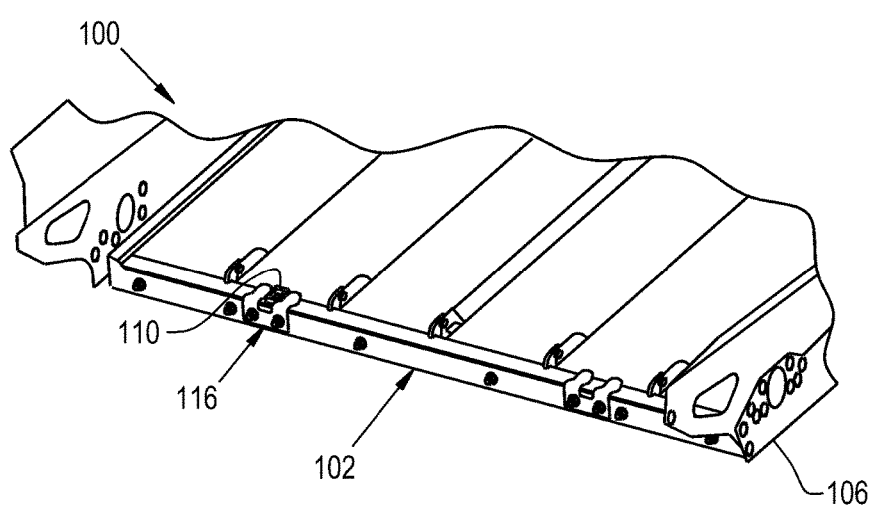
FIG. 3 is fragmented, perspective of the sieve arrangement shown in FIG. 2.
Figure 4:
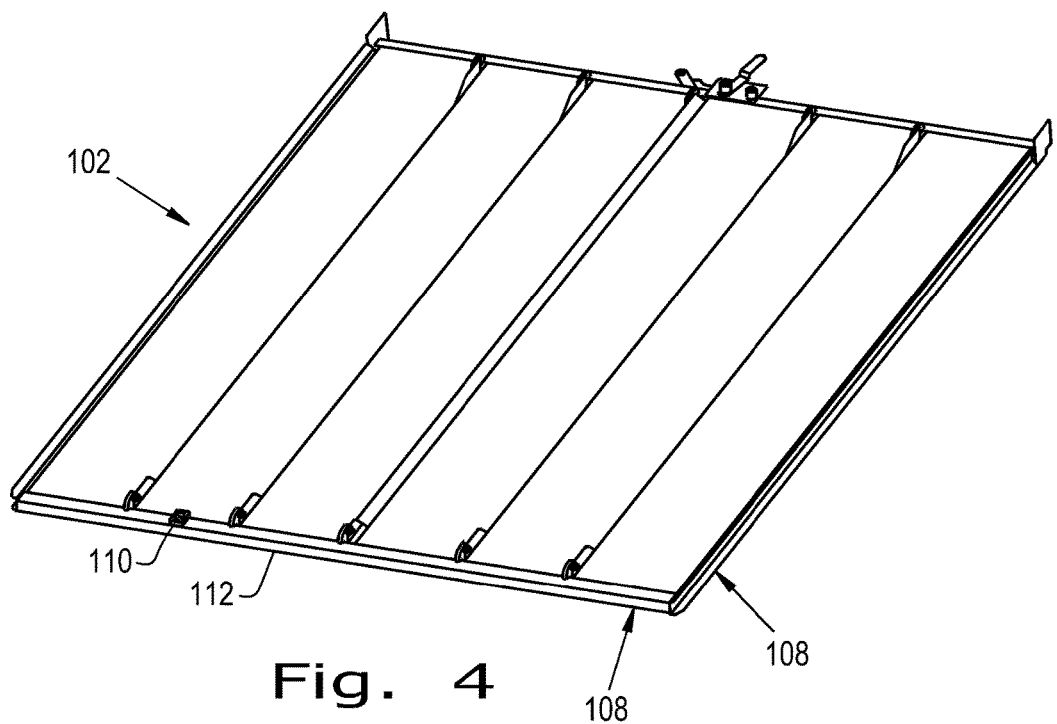
FIG. 4 is a perspective view of the sieve shown in FIGS. 2 and 3.
Figure 5:
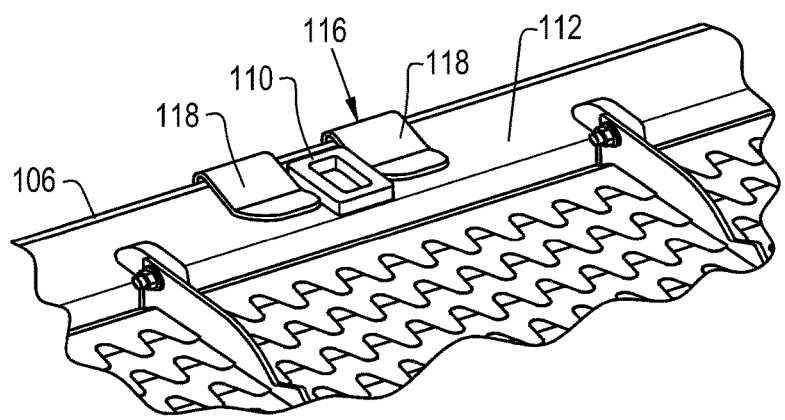
FIG. 5 is a fragmented, perspective view of the sieve shown in FIG. 4.
Figure 6:
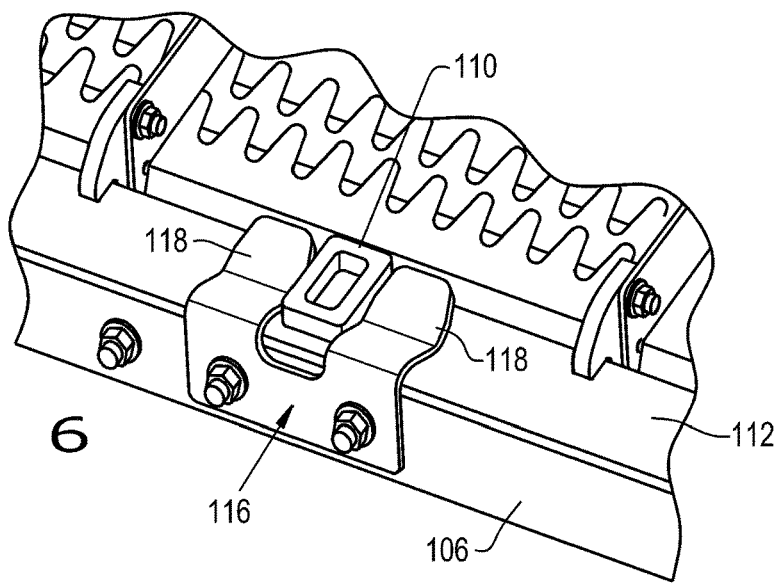
FIG. 6 is another fragmented, perspective view of the sieve shown in FIGS. 4 and 5.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Referring now to FIGS. 2-6, there is shown an embodiment of a sieve arrangement 100 of the present invention, including a sieve 102 which can be part of the cleaning system 26 shown in FIG. 1, such as at a sieve location corresponding to sieves 46, 48 and/or 50.

Current sieve designs clamp the sieve at the top and bottom of the sieve, and restrain the sieve at the sides. In contrast, the sieve 102 of the present invention loads as a cartridge into the chaffer frame 104, and rests on rails 106 within the chaffer frame 104. Thus, there is no rigid vertical or lateral fixation of the sieve 102 within the chaffer frame 104.

More particularly, the sieve 102 has a periphery 108 and an interference member 110 located at the periphery 108. In the illustrated embodiment, the interference member 110 is in the form of a rectangular block which is mounted to and extends from a peripheral frame member 112 of the sieve 102. In more detail, the interference member 110 protrudes outwardly, e.g. substantially transverse, from the surface of the peripheral frame member 112 of the sieve 102. However, the interference member 110 could be differently configured, such as a disk shaped member, rod, etc.

The chaffer frame 104 carries the sieve 102, and includes a pair of rails 106 upon which the sieve 102 rests. The sieve 102 can be loaded into the chaffer frame 104 as a cartridge. The chaffer frame 104 also includes a clamp 116 with a pair of spring fingers 118 positioned on either side of the interference member 110, thereby retaining the sieve 102 within the chaffer frame 104. Each spring finger 118 contacts onto each respective side of the interference member 110, and in this regard the sieve 102 can be loaded into the chaffer frame 104 as a cartridge. The clamp 116 inhibits movement of the sieve 102 within the chaffer frame 104 in two axes. The spring loaded fingers 118 of the clamp 116 can also act as a guide to guide the sieve 102 into position within the chaffer frame 104 during loading. To that end, the spring fingers 118 can include a beveled end (not numbered, but shown, e.g., in FIG. 5) that assists in guiding the sieve into position within the chaffer frame.

Figure 7:
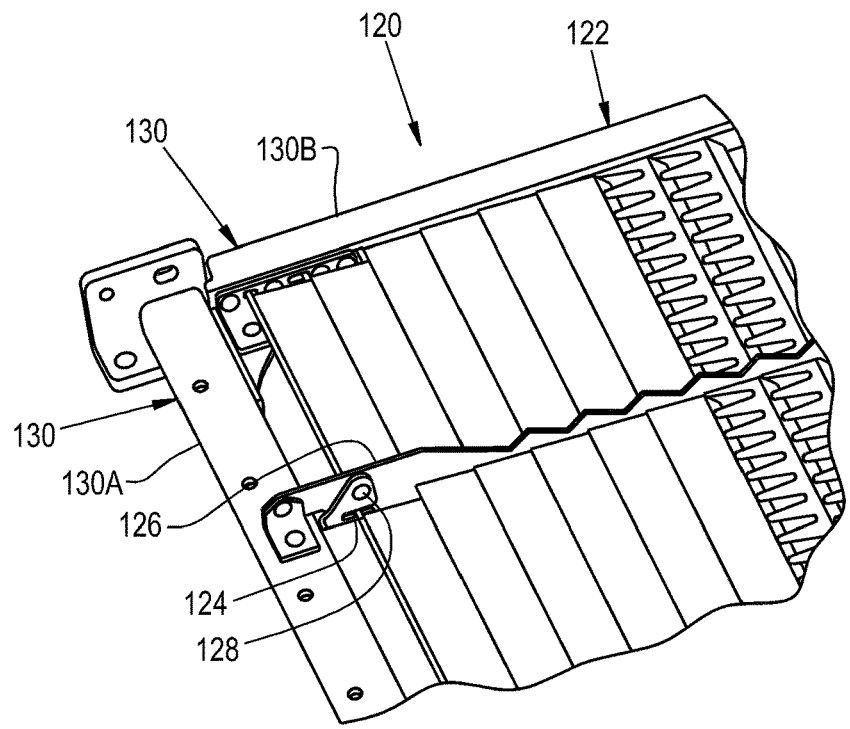
FIG. 7 is a fragmented, perspective view of another embodiment of a sieve of the present invention.
Figure 8:
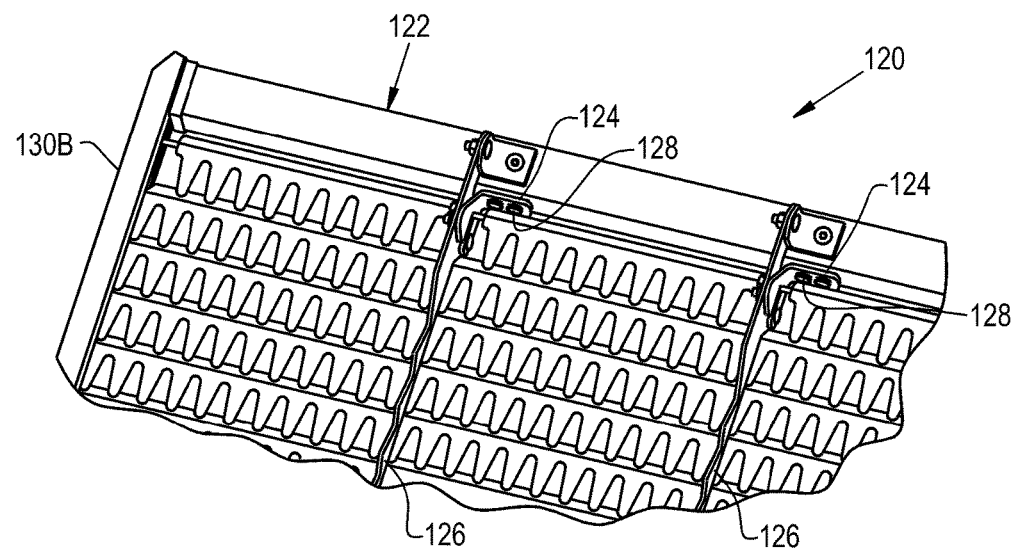
FIG. 8 is another fragmented, perspective view of the sieve shown in FIG. 7.
Figure 9:
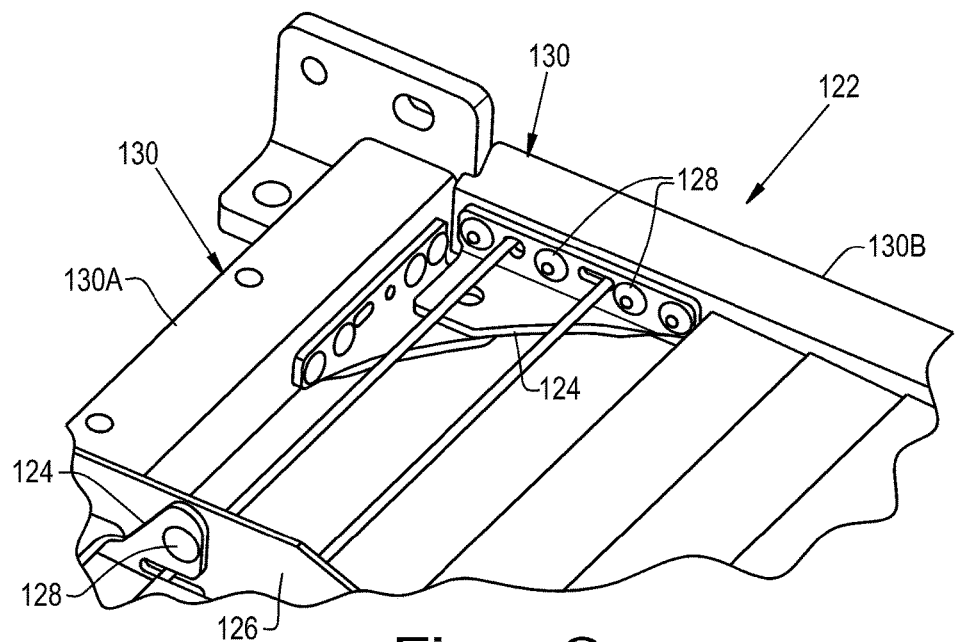
FIG. 9 is another fragmented, perspective view of the sieve shown in FIGS. 7 and 8.

Referring now to FIGS. 7-9, there is shown another embodiment of a sieve arrangement 120 of the present invention, including a sieve 122 which can be part of the cleaning system 26 shown in FIG. 1, such as at a sieve location corresponding to sieves 46, 48 and/or 50.

The sieve arrangement 120 can oscillate back and forth at 4.5 hz or higher. This subjects the sieve arrangement 120, including the sieves 122, to cyclical loads. Conventional sieves may not meet reliability goal with welded rear corner gussets and welded dividers due to the low allowable cyclical fatigue life of welds. In order to meet goals, allowable cyclical fatigue limits of welds would need to be approximately/−3.2 ksi or less. The allowable cyclical fatigue limit of non-welded joint is approximately/−12 ksi. By eliminating welds, the life expectancy of the sieve 122 is greatly improved. Since the front and rear structural members of the sieves are tubes, simply bolting the gussets and dividers creates a problem since bolting through a tube doesn't create a tight bolted joint. Also, bolts consume a large area and hinders permeable area needed for maximum cleaning of grain.

The sieves 122 are configured so rear corner gussets 124 and/or dividers 126 can be riveted using rivets 128. Rivets 128 are easy to install, and take the place of welded joints to increase the reliability. Each rivet 128 takes the place of at least one bolt and nut and/or welded connection. The rivets 128 are quicker to install than bolts and nuts. Additionally, no torquing of the joint is required, as is the case if a bolted connection was used.

More particularly, the sieve 122 can include a plurality of peripheral frame members 130, and a plurality of adjustable finger plates 132 mounted within the frame members 130. At least two of the frame members 130 are interconnected with each other via a gusset 124 and rivets 128. The peripheral frame members 130 can include a rear frame member 130A and a pair of side frame members 130B, with the rear frame member 130A being attached to each of the side frame members 130B via a respective gusset 124 and a plurality of rivets 128. The peripheral frame members 130 can also include a front frame member 130C. One or more dividers 134 can extend in a fore/aft direction between the front frame member 130C and the rear frame member 130A. Each divider 134 can be attached to the rear frame member 130A via a respective gusset 124 and a plurality of rivets 128.

In the illustrated embodiment, the rivets 128 are configured as standard rivets. However, the rivets 128 can also be configured as specially configured rivets, such as rivnuts.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A cleaning system for an agricultural combine harvester, comprising:
   a sieve having a periphery and an interference member located at the periphery, the interference member protrudes outwardly from the periphery; and
   a chaffer frame carrying the sieve, the chaffer frame including a clamp with a pair of spring fingers positioned on and contacting either exterior side of the interference member such that the sieve is loaded into the chaffer frame as a cartridge, thereby retaining the sieve within the chaffer frame.

2. The cleaning system of claim 1, wherein the interference member is a rectangular block which is mounted to and extends from a peripheral frame member of the sieve.

3. The cleaning system of claim 1, wherein the chaffer frame includes a pair of rails, and the sieve rests on the rails.

4. The cleaning system of claim 1, wherein the clamp inhibits movement of the sieve within the chaffer frame in two axes.

5. The cleaning system of claim 4, wherein the sieve is moved in both fore-aft directions and side-to-side directions, and the clamp inhibits relative movement between the sieve and chaffer frame in each of the fore-aft and side-to-side directions.

6. The cleaning system of claim 1, wherein the spring loaded fingers of the clamp act as a guide to guide the sieve into position within the chaffer frame during loading.

7. The cleaning system of claim 6, wherein each of the spring fingers has a beveled distal end that assists in guiding the sieve into position within the chaffer frame.

8. An agricultural combine harvester, comprising:
   a chassis; and
   a cleaning system carried by the chassis, the cleaning system including:
      a sieve having a periphery and an interference member located at the periphery, the interference member protrudes outwardly from the periphery; and
      a chaffer frame carrying the sieve, the chaffer frame including a clamp with a pair of spring fingers positioned on and contacting either exterior side of the interference member such that the sieve is loaded into the chaffer frame as a cartridge, thereby retaining the sieve within the chaffer frame.

9. The agricultural combine harvester of claim 8, wherein the interference member is a rectangular block which is mounted to and extends from a peripheral frame member of the sieve.

10. The agricultural combine harvester of claim 8, wherein the chaffer frame includes a pair of rails, and the sieve rests on the rails.

11. The agricultural combine harvester of claim 8, wherein the clamp inhibits movement of the sieve within the chaffer frame in two axes.

12. The agricultural combine harvester of claim 11, wherein the sieve is moved in both fore-aft directions and side-to-side directions, and the clamp inhibits relative movement between the sieve and chaffer frame in each of the fore-aft and side-to-side directions.

13. The agricultural combine harvester of claim 8, wherein the spring fingers of the clamp act as a guide to guide the sieve into position within the chaffer frame during loading.

14. The agricultural combine harvester of claim 13, wherein each of the spring fingers has a beveled distal end that assists in guiding the sieve into position within the chaffer frame.

* * * * *